(12) United States Patent  
Rudenstine et al.

(10) Patent No.: US 9,194,713 B2  
(45) Date of Patent: Nov. 24, 2015

(54) LOGO-ENABLED INTERACTIVE MAP INTEGRATING SOCIAL NETWORKING APPLICATIONS

(71) Applicant: CityMaps, New York, NY (US)

(72) Inventors: Aaron Rudenstine, New York, NY (US); Elliot Cohen, New York, NY (US); Robert M. Matsuoka, New York, NY (US); Adam J. Eskreis, Astoria, NY (US); Anthony J. Campagna, Astoria, NY (US); Benjamin O. Gundersen, New York, NY (US); Megan M. Isaak, Plainsboro, NJ (US); Mohammed R. Hamid, New York, NY (US)

(73) Assignee: Citymaps, New York, NY (US)

( * ) Notice: Subject to any disclaimer, the term of this patent is extended or adjusted under 35 U.S.C. 154(b) by 91 days.

(21) Appl. No.: 13/907,906

(22) Filed: Jun. 1, 2013

(65) Prior Publication Data

US 2013/0326365 A1 Dec. 5, 2013

Related U.S. Application Data

(60) Provisional application No. 61/654,195, filed on Jun. 1, 2012.

(51) Int. Cl.  
*G06F 3/14* (2006.01)  
*G01C 21/34* (2006.01)  
*G06F 17/30* (2006.01)  
*G06F 3/0484* (2013.01)  
*G01C 21/36* (2006.01)

(52) U.S. Cl.  
CPC .............. *G01C 21/34* (2013.01); *G01C 21/343* (2013.01); *G01C 21/3423* (2013.01); *G01C 21/3484* (2013.01); *G01C 21/3682* (2013.01); *G06F 3/0484* (2013.01); *G06F 17/30241* (2013.01); *G06F 17/30477* (2013.01); *G06F 17/30943* (2013.01); *G06F 2203/04806* (2013.01)

(58) Field of Classification Search  
CPC ..................................... G06F 3/14; G06F 3/17  
USPC ........................................................ 715/751  
See application file for complete search history.

(56) References Cited

U.S. PATENT DOCUMENTS

| | | | |
|---|---|---|---|
| 2006/0026170 A1* | 2/2006 | Kreitler et al. | 707/10 |
| 2009/0088964 A1* | 4/2009 | Schaaf et al. | 701/200 |
| 2012/0078505 A1* | 3/2012 | Nakamura | 701/411 |

* cited by examiner

*Primary Examiner* — Ruay Ho  
(74) *Attorney, Agent, or Firm* — Lowenstein Sandler LLP

(57) ABSTRACT

A logo-enabled interactive map integrating social networking applications is provided. The interactive map may be configured to help end users discover and share information (e.g., events, deals, news occurrences, etc.) associated with a plurality of venues.

15 Claims, 19 Drawing Sheets

LOGO-ENABLED INTERACTIVE MAP INTEGRATING SOCIAL NETWORKING APPLICATIONS

CROSS-REFERENCE TO RELATED APPLICATION

The present application claims priority to U.S. Provisional Patent Application No. 61/654,195, filed Jun. 1, 2012, the disclosure of which is incorporated herein in its entirety.

TECHNICAL FIELD

Embodiments of the invention relate generally to geographical mapping applications and, more specifically, to a logo-enabled interactive map integrating social networking applications.

BACKGROUND

Mapping applications are used for navigational purposes to aid end users in getting from one geographic point of interest to another. Unfortunately, traditional mapping applications present cluttered views of building outlines and often integrate elements that are not particularly useful to end users. Additionally, traditional mapping applications are typically limited to only providing information in response to specific geographic requests received from an end user.

There is a desire to improve traditional mapping applications so that they provide information not only about geographical points of interest desired by an end user, but also to integrate non-geographical information based on various activity and interests associated with the end user.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which:

FIG. 3A is a flow diagram illustrating an embodiment of a method for conducting a search for venues, wherein

FIGS. 5A and 5B are flow diagrams illustrating embodiments of methods, respectively, for enabling a trip planning tool and providing an optimized path of travel associated with the use of the trip planning tool, wherein

FIGS. 6A and 6B are flow diagrams illustrating embodiments of methods, respectively, for determining venue representations and determining their corresponding display on the interactive map, wherein

FIG. 7A is a flow diagram illustrating an embodiment of a method for enabling a friend tracking tool, wherein

DETAILED DESCRIPTION

Figure 1:
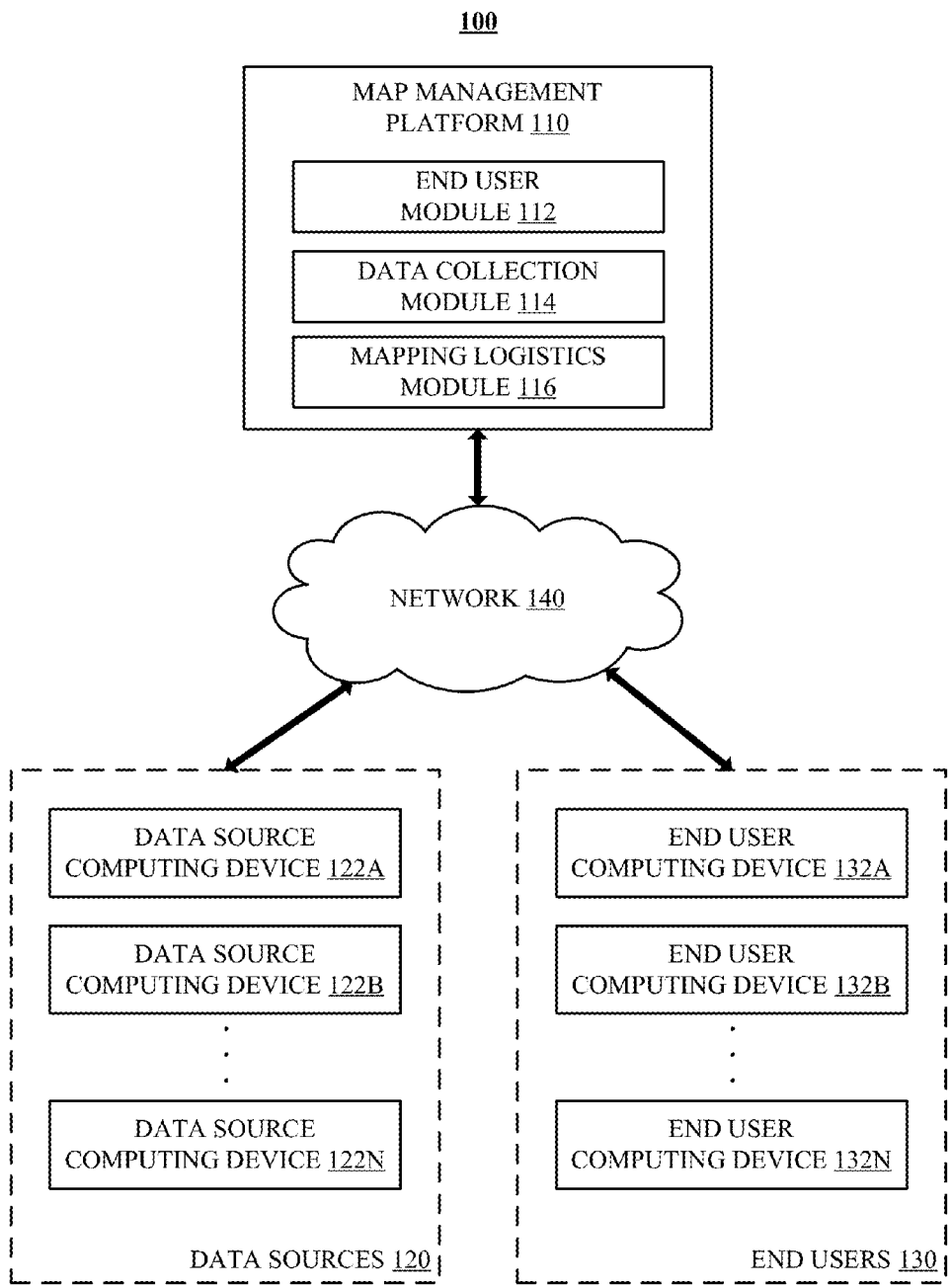
FIG. 1 is a block diagram illustrating an exemplary computer network in which embodiments of the present invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "identifying", "verifying", "generating", "transmitting", "processing", "selecting", "populating", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus.

Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary computer network 100 in which embodiments of the present invention may operate. Referring to FIG. 1, computer network 100 may be comprised of at least one map management platform 110, a plurality of computing devices 122A-122N associated with external data sources 120 and a plurality of computing devices 132A-132N associated with end users 130. Computing devices associated with external data sources 120 and end users 130 may be communicatively coupled, via a network 140, to one or more computer processing and storage accessible components of map management platform 110. Network 140 may be a private network (e.g., a local area network (LAN), wide area network (WAN), intranet, etc.) or a public network (e.g., the Internet).

Map management platform 110 may be comprised of one or more computing components configured to handle various processes of the present invention, as described herein. For example, map management platform 110 may be comprised of an end user module 112, a data collection module 114 and a mapping logistics module 116.

Figure 2:
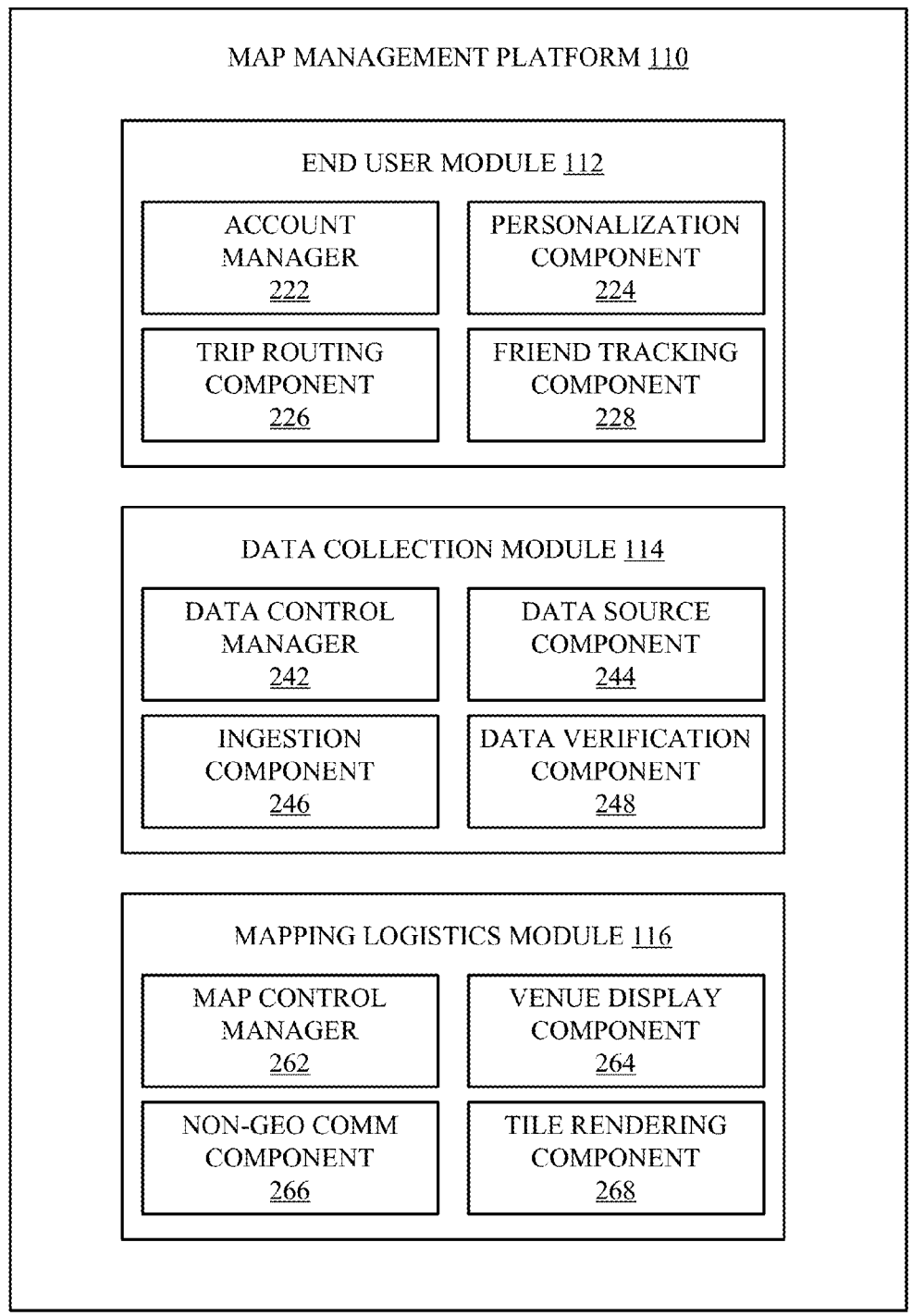
FIG. 2 is a block diagram illustrating exemplary components of a map management platform illustrated in FIG. 1.

In one embodiment, end user module 112 may be configured to manage all aspects of an end user's interaction with the interactive map of the present invention. End user module 112 may be comprised of a plurality of components for processing instructions to execute methods associated with various features available to an end user on the interactive map. Referring to FIG. 2, end user module 112 may comprise, for example, an account manager 222, a personalization component 224, a trip routing component 226 and a friend tracking component 228.

In one embodiment, data collection module 114 may be configured to manage all aspects of data collected to be integrated in the interactive map of the present invention. Data collection module 114 may be comprised of a plurality of components for processing instructions to execute methods associated with collecting and integrating data into the interactive map. Referring to FIG. 2, data collection module 114 may comprise, for example, a data control manager 242, a data source component 244, an ingestion component 246 and a data verification component 248.

In one embodiment, mapping logistics module 116 may be configured to manage all aspects of geographic and non-geographic elements integrated in the interactive map of the present invention. Mapping logistics module 116 may be comprised of a plurality of components for processing instructions to execute methods associated with integrating geographic and non-geographic elements into the interactive map. Referring to FIG. 2, mapping logistics module 116 may comprise, for example, a map control manager 262, a venue display component 264, a non-geographic communication component 266 and a tile rendering component 268.

Those skilled in the art will appreciate that map management platform 110 may be configured with more or less modules and components to conduct the methods described herein with reference to FIGS. 3A, 4A-5B, 6A, 6B, 7A and 8. As illustrated in FIGS. 3A, 4A-5B, 6A, 6B, 7A and 8, each of corresponding methods 300, 400, 450, 500, 520, 600, 620, 700 and 800 may be performed by processing logic that may comprise hardware (e.g., circuitry, dedicated logic, programmable logic, microcode, etc.), software (such as instructions run on a processing device), or a combination thereof. In one embodiment, methods 300, 400, 450, 500, 520, 600, 620, 700 and 800 may be performed by one or more processing components associated with modules 112, 114 and 116 of map management platform 110.

Figure 3A:
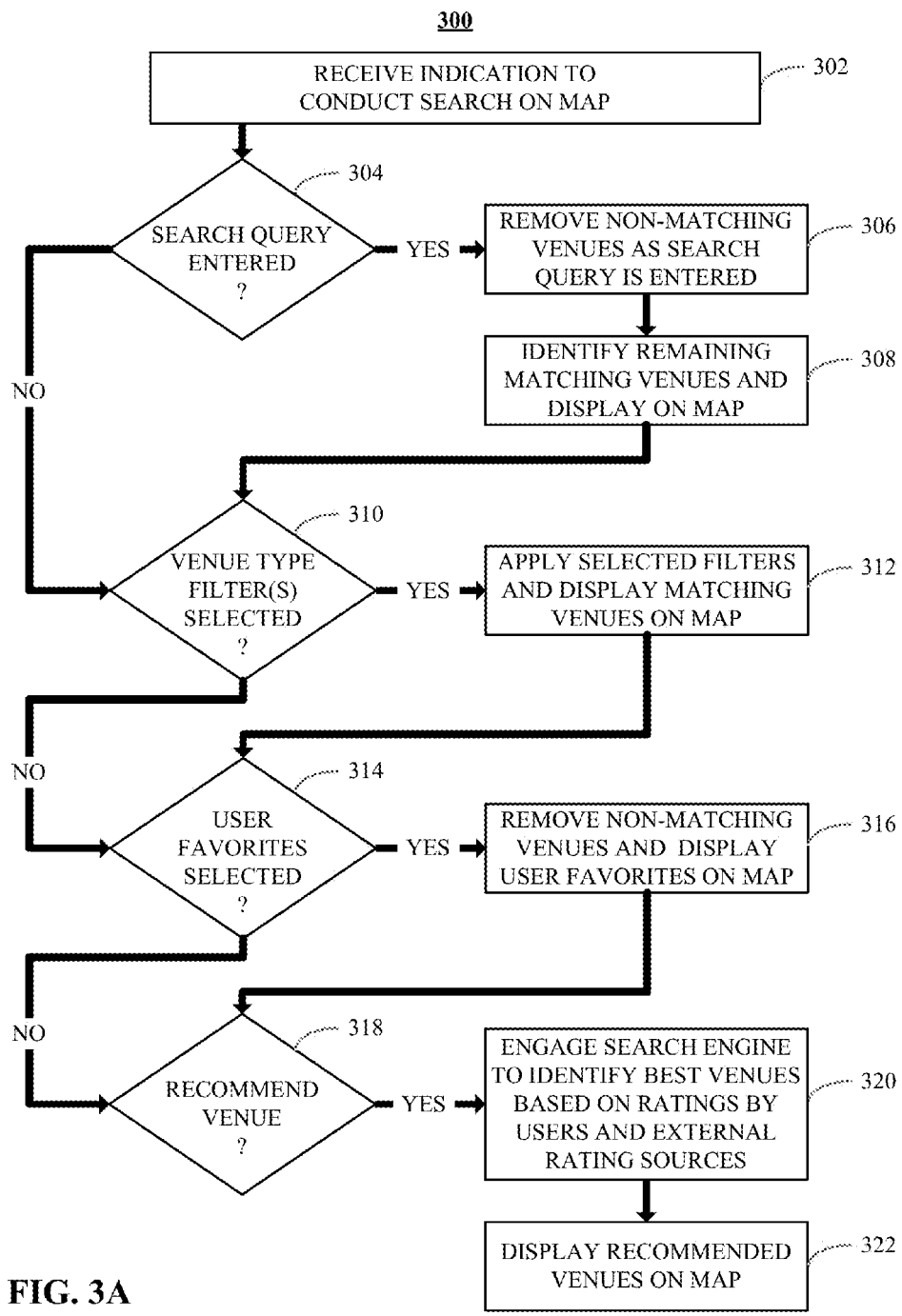

FIG. 3A is a flow diagram illustrating a method 300 of conducting a search for venues using the interactive map, according to an embodiment of the invention. Referring to FIG. 3A, method 300 may be initiated upon receiving, at block 302, an indication to conduct a search on the interactive map. The interactive map may provide an end user with a plurality of search options including, but not limited to, a search field for receiving a search query, category filters for identifying certain venue types (e.g., bars, shopping, entertainment, etc.) of interest, a search based on stored venues previously identified by an end user (e.g., a venue stored as a "favorite" or any other similar personalization attribute), and system suggested venues using a recommendation search engine. Which of the foregoing search options employed may be determined, at blocks 304, 310, 314 and 318, and corresponding actions may be taken, at blocks 306, 308, 312, 316, 320 and 322, to display relevant venues on the interactive map.

A notable search feature of the interactive map is an embodiment enabling a visual active search. Upon receiving, at block 304, entry of a search query in a search field of the interactive map, venue representations (i.e., business logos, names, categorical icons, etc.) populated on the interactive map for a particular geographic location may be removed, at block 306, in real-time as characters of the search query are entered in the search field to yield, at block 308, matching venues. For example, an end user searching for a Starbucks venue in a defined geographic location will begin to enter the corresponding characters in the name "Starbucks", resulting in non-matching venue representations being removed from the interactive map as additional characters are entered in the search field.

In one embodiment, venues not matching characters of a search query entered in the search field may still be displayed on the interactive map. For example, an end user searching for "Joe's Coffee Shop" may see venue representations associated with the specific venue searched, as well as non-matching venue representations (e.g., associated with Starbucks) if a predefined association is made between a term in the search query (e.g., Coffee), or the specific venue searched, and the non-matching venue. In other words, a predefined association may be provided allowing for venue representations associated with Starbucks to be displayed, in addition to the desired venue being searched, whenever a search query for "Joe's Coffee Shop" or any search containing the term "coffee" is made. The predefined associations may be provided as means for making relevant recommendations to an end user, while still removing other non-matching venue representations (not having a predefined association) from the interactive map.

Another notable search feature of the interactive map is an embodiment enabling a recommendation search engine to be engaged, at block 320, to make venue recommendations. The end user may submit an inquiry (e.g., identify the best Chinese restaurants in Soho) and receive a recommendation of venues, identified as venue representations on the interactive map displaying the Soho area. The recommendation engine may provide visual representations of both a favorability rating of a venue and a "hotness" value associated with the venue. The favorability rating may be based on a score determined by applying an algorithm on aggregate ratings of a number of external and internal sources. A "hotness" value may be generated by using trending values (e.g., frequency of recent mentions, ratings and "likes" received) culled from external sources combined with information from users of the interactive map. The favorability rating and "hotness" value may be combined using a unique visual representation, allowing users to immediately identify desirable venues.

Figure 3B:
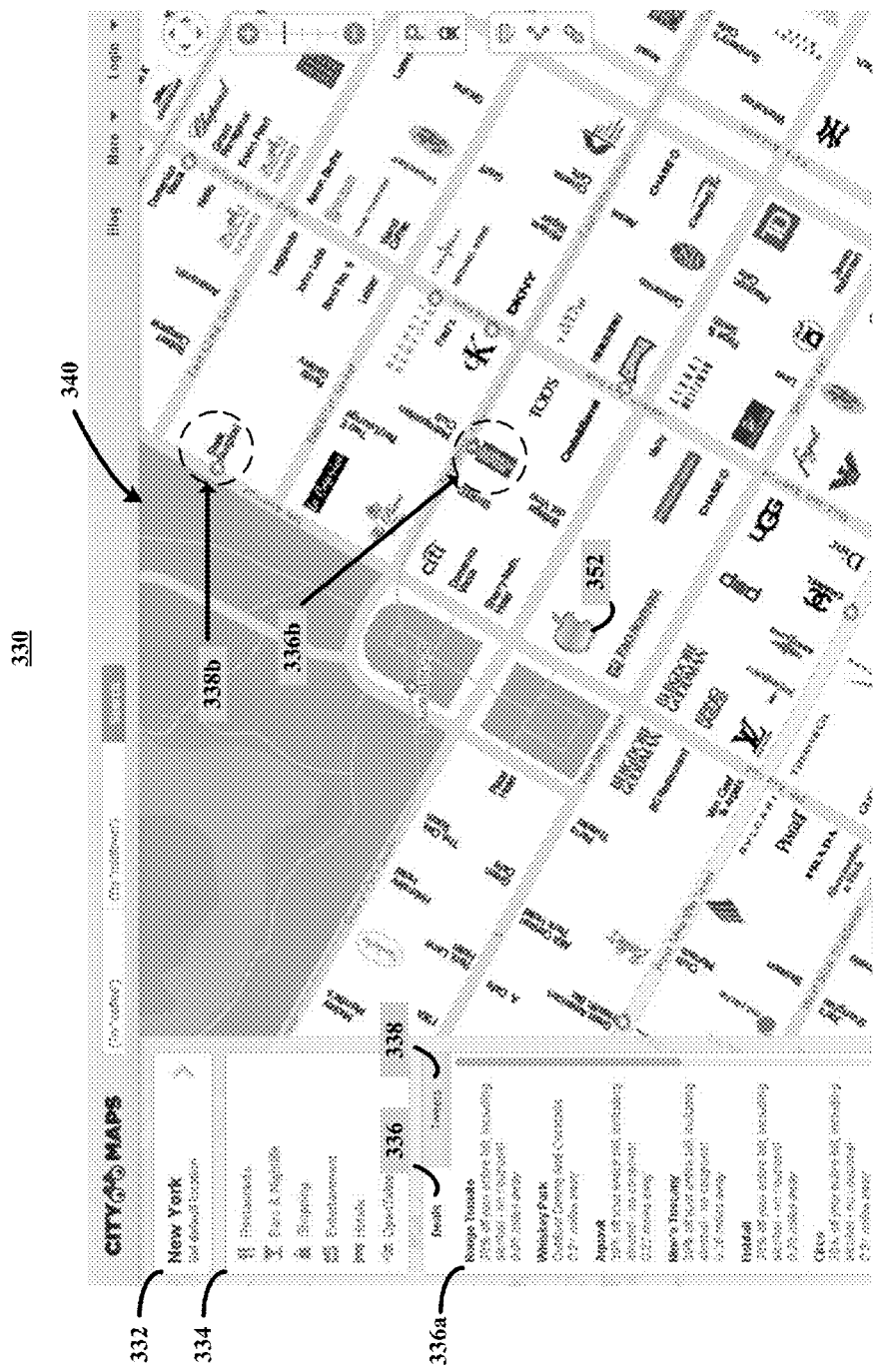
FIGS. 3B-3D are screen shots illustrating various options, visual elements and search options integrated in the interactive map.
Figure 3C:
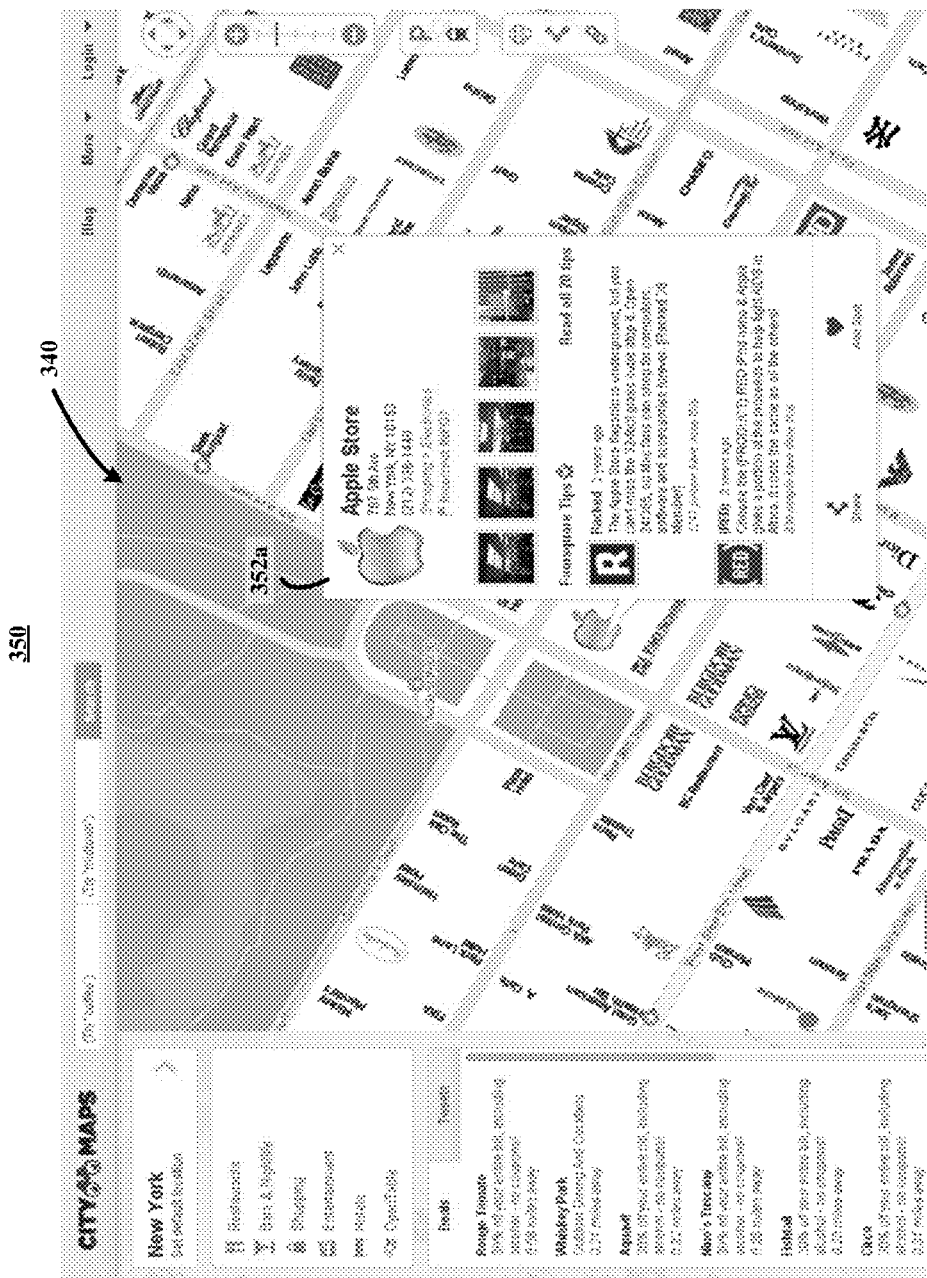
Figure 3D:
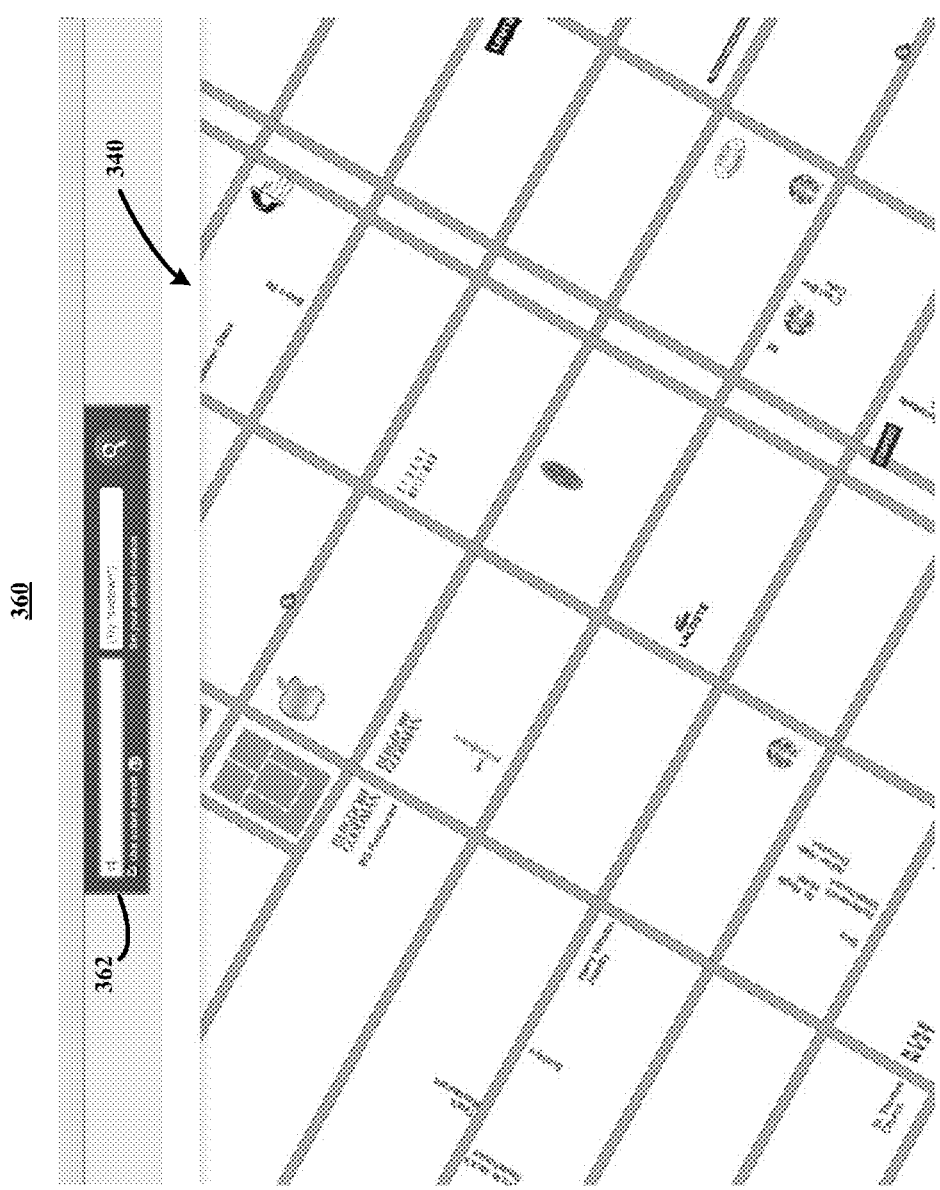

FIGS. 3B-3D are screen shots illustrating various options, visual elements and some of the search options, as described in conjunction with FIG. 3A, integrated in the interactive map. FIG. 3B is a screen shot 330 illustrating a basic layout of the interactive map, which may provide a city location identification field 332, a venue type search filter menu 334, and listing tabs 336 and 338 comprising, respectively, deals and tweets corresponding to the area of the interactive map being viewed. Icons 336b and 338b illustrated next to venue representations on a main window 340 of the interactive map correspond, respectively, to deals and tweets listed under listing tabs 336 and 338. For example, a deal 336a identified under listing tab 336 may be represented by a deal icon 336b (e.g., a dollar sign symbol) adjacent to the corresponding venue logo displayed on main window 340 of the interactive map. Similarly, a tweet identified under listing tab 338 may be represented by a tweet icon 338b (e.g., the Twitter bird logo) adjacent to the corresponding venue name displayed on main window 340 of the interactive map.

FIG. 3C is a screen shot 350 illustrating a pop-up window 352a associated with a venue representation 352, as illustrated in FIG. 3B, selected by an end user. Window 352a may overlay main window 340 of the interactive map. Window 352a may contain various information about the selected venue including, but not limited to, identifying to the end user what the venue is, where it is, how to contact it, what has happened at the venue recently, what is happening at the venue in the near future, what deals or specials are available, what people are saying about the venue, and what the venue looks like. Depending on the type of venue selected, additional information may be displayed, such as menus, movie showings and showtimes, movie previews, and parking rates.

FIG. 3D is a screen shot 360 illustrating the visual active search feature of the interactive map, as previously described in method 300. When an end user begins to type a search query in search field 362, venue representations matching characters entered in search field 362 are displayed on main window 340 of the interactive map, while venue representations that don't have the corresponding matching characters entered may be removed from the display of main window 340.

Figure 4A:
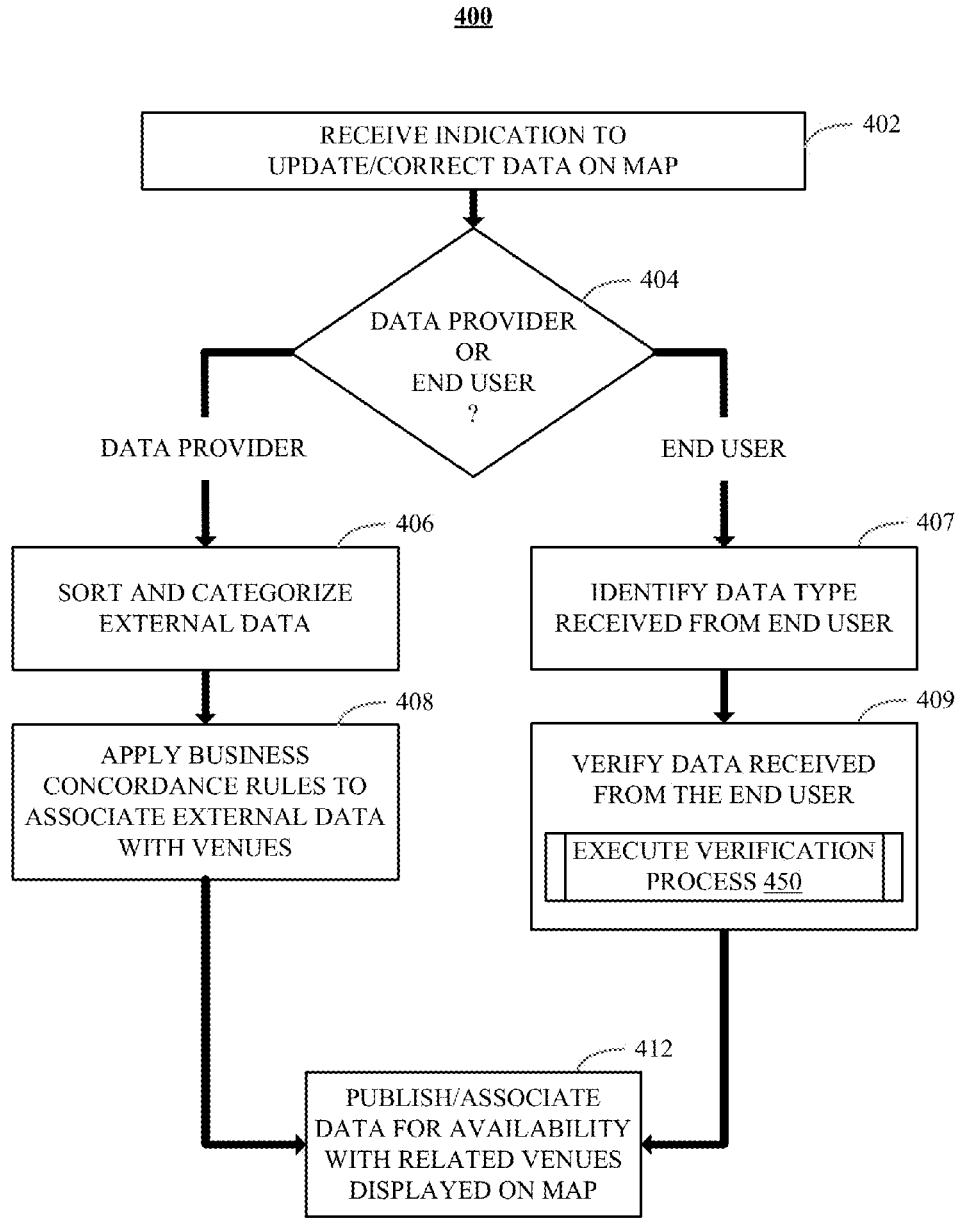
FIGS. 4A and 4B are flow diagrams illustrating embodiments of methods, respectively, for handling receipt of data and verifying the data received to be published on the interactive map.

FIG. 4A is a flow diagram illustrating a method 400 for handling data received to be published on or associated with a venue displayed on the interactive map, according to an embodiment of the invention. Referring to FIG. 4A, method 400 may be initiated upon receiving, at block 402, an indication to update or correct data associated with venues identified on the interactive map. Method 400 may make a determination, at block 404, whether the source of data is being received from a verified data provider (e.g., Yellow Pages, Foursquare, Facebook, etc.) or from an end user. In method 400, data received from a data provider may undergo an ingestion process, at blocks 406 and 408, and data received from an end user may undergo an identification and verification process, at blocks 407 and 409, prior to being published, at block 412, on the interactive map.

The ingestion process may pull external geo-tagged data based on business rules and schedules, aggregate the data in such a fashion as to make this data relevant to map users, and correlate the data with business venues maintained in a database associated with the interactive map. Once the geo-tagged data has been correlated, it may be provided on the interactive map using any one of a plurality of map presentation data formats. The geo-tagged data may additionally be pulled into an indexing tool for fast retrieval based on location and keywords.

Figure 4B:
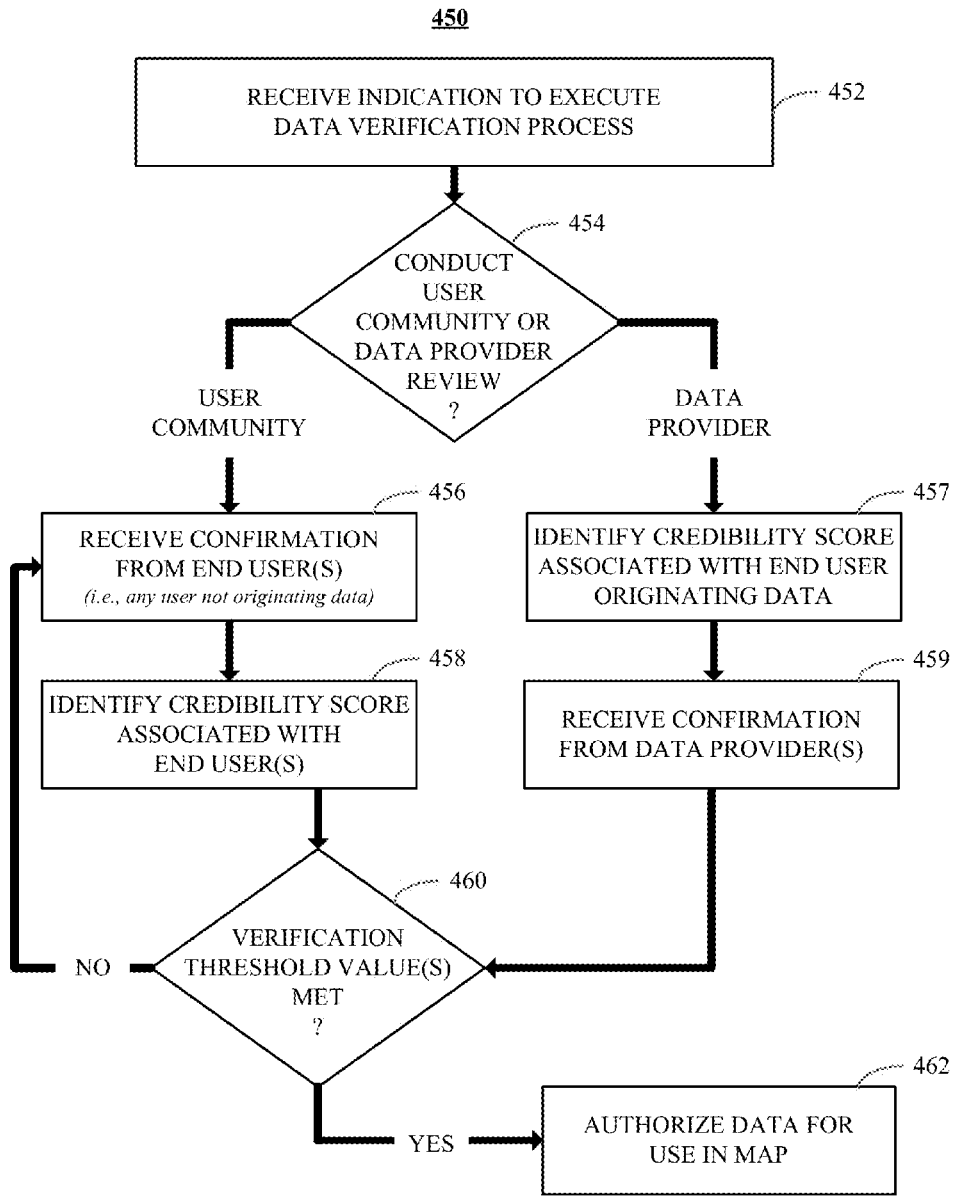

FIG. 4B is a flow diagram illustrating a method 450 for verifying data received to be published on the interactive map or associated with a venue displayed on the interactive map, according to an embodiment of the invention. Referring to FIG. 4B, method 450 may be initiated upon receiving, at block 452, an indication to verify data for use in the interactive map. Method 450 may make a determination, at block 454, whether to implement the verification process based on relevant input received from a user community, relevant input received from a data provider, credibility of the end user originating the data or a combination thereof. In method 450, data to be verified based on input received from a user community may undergo a process, at blocks 456, 458 and 460, and data to be verified based on input received from a data provider or credibility of the end user originating the data may undergo a process, at blocks 457, 459 and 460, before the data is authorized, at block 462, for use in the interactive map.

When the user community is employed for the verification process, method 450 may receive, at block 456, relevant data from one or more end users in the user community confirming validity of the data received from the originating end user. To advance and ensure a reliable verification process, credibility scores associated with end users in the user community may be identified, at block 458. Similarly, when credibility of the end user originating the data is employed for the verification process, method 450 may identify, at block 457, a credibility score associated with the end user originating the data.

When a data provider is employed for the verification process, method 450 may receive, at block 459, relevant data from one or more data providers to confirm validity of the data received from the originating end user. Relevant data received from the data provider may be comprised of, but is certainly not limited to, business information (e.g., address records, phone records, hours of operation, etc.), posted social activity (e.g., a recent check-in, a Facebook "like", recent reviews, etc.), posted financial activity or any combination thereof.

Regardless of the review type selected for the verification process of method 450, a determination may be made, at block 460, whether verification threshold values have been met. When verification threshold values are met (e.g., a minimum number of end users confirming validity of data, acceptable credibility scores, etc.), then the data received from the originating user may be validated and authorized, at block 462, for use in the interactive map.

Figure 5A:
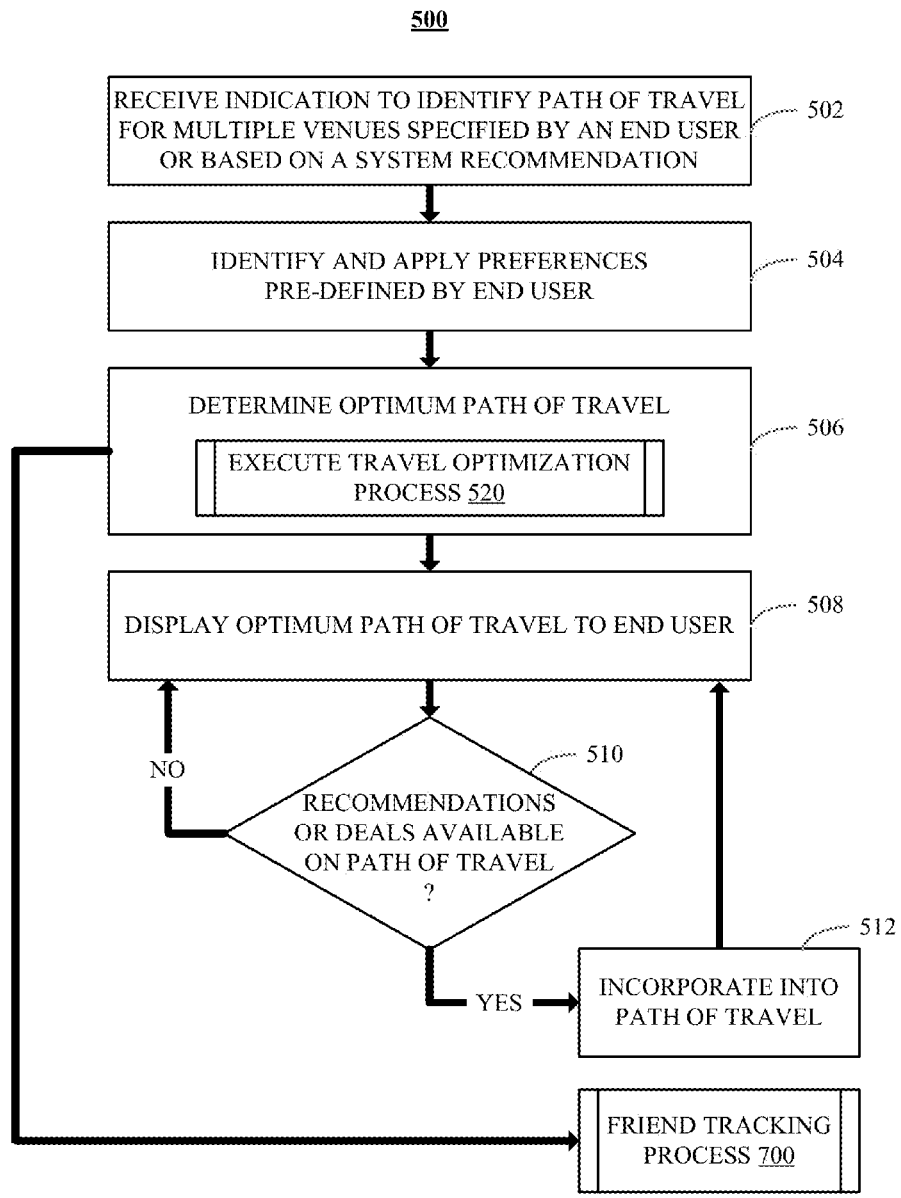

FIG. 5A is a flow diagram illustrating a method 500 for enabling a trip planning tool on the interactive map, according to an embodiment of the invention. Referring to FIG. 5A, method 500 may be initiated upon receiving, at block 502, an indication to identify a path of travel to multiple venues, which may be specified by an end user or based on a system recommendation. In determining the path of travel to multiple venues, pre-defined user preferences may be taken into consideration, at block 504, prior to determining, at block 506, the optimum path of travel and displaying, at block 508, the optimum travel path to the end user.

Method 500 may make a determination, at block 510, whether there are any recommended points of interest or deals available on the suggested optimum path of travel and, if so, they may be incorporated, at block 512, into the suggested optimum path of travel displayed to the end user. Recommendations incorporated into the optimum path of travel may be based on user preferences explicitly and implicitly gathered. Explicit preferences may be identified using an option panel that allows users to select favorite categories, tags, events, specials, and deals. Implicit preferences may be identified using information gathered from past searches, businesses clicked on, the favorability rating and the hotness value of venues, and data gathered from social media connections.

Figure 5B:
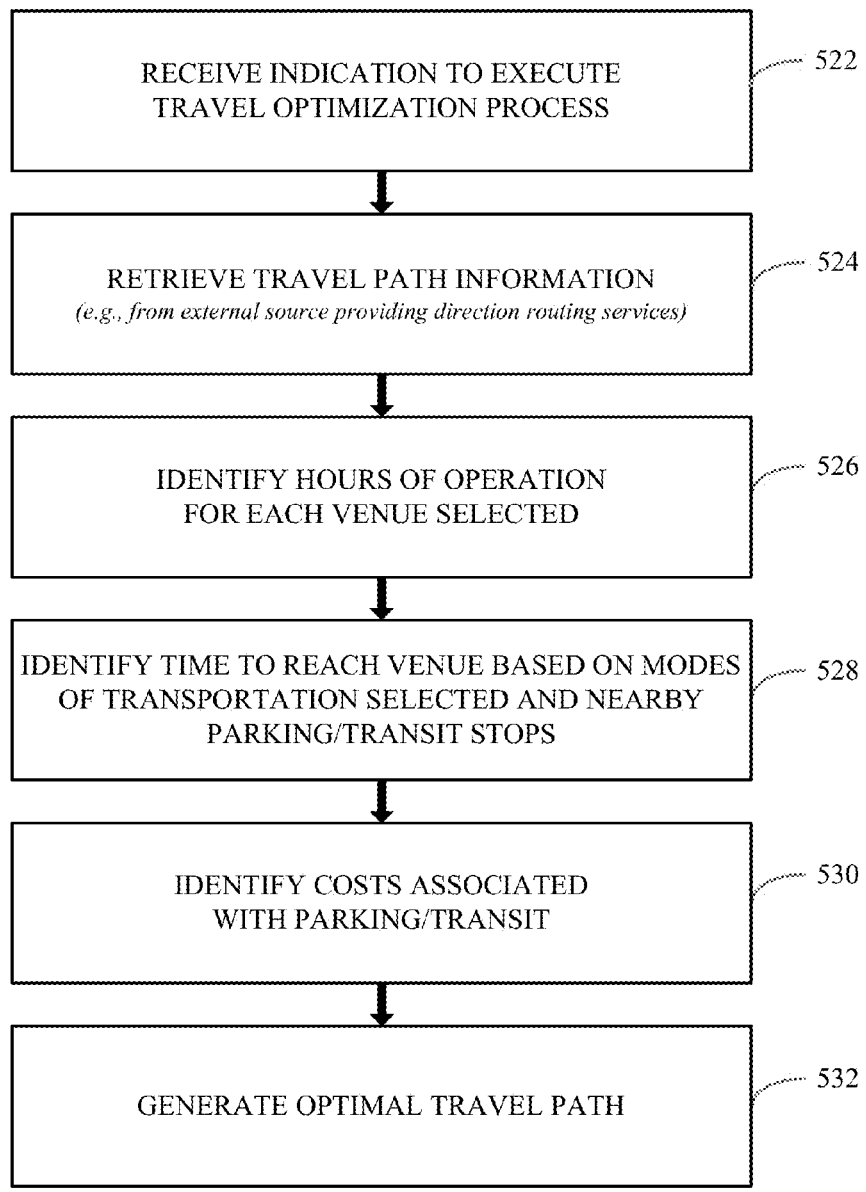

FIG. 5B is a flow diagram illustrating a method 520 for determining an optimum path of travel, according to an embodiment of the invention. Referring to FIG. 5B, method 520 may be initiated upon receiving, at block 522, an indication to execute a travel optimization process. In determining an optimum path of travel to multiple venues, one or more possible routes may be retrieved (e.g., by external sources providing direction routing services), at block 524, to identify the route presenting the best path of travel to the selected venues.

In determining the optimum path of travel, additional information may be taken into consideration pertaining to the multiple venues selected. For example, the hours of operation for a venue may be identified, at block 526, the time to reach a venue based on modes of transportation selected and nearby parking or transit stops may be identified, at block 528, the costs associated with parking and transit may be identified, at block 530, other applicable information associated with travel to a venue or a combination thereof. Upon consideration of the various inputs, an optimal path of travel may be generated, at block 532, for presentation to an end user.

Figure 5C:
FIG. 5C is a screen shot illustrating various visual elements associated with the aforementioned methods.

FIG. 5C is a screen shot 540 illustrating directions for a suggested optimum path of travel 542, which may incorporate logos 542a and 542b associated with venues, respectively, for landmark purposes and to suggest points of interest along the travel path. In one embodiment, venues that an end user's friends have highlighted (e.g., via Facebook) may be suggested along the path of travel, along with venues that are similar to the venues that the end user has previously highlighted. Additionally, a listing of deals, specials and events 544 may be provided along the suggested optimum path of travel.

Figure 6A:
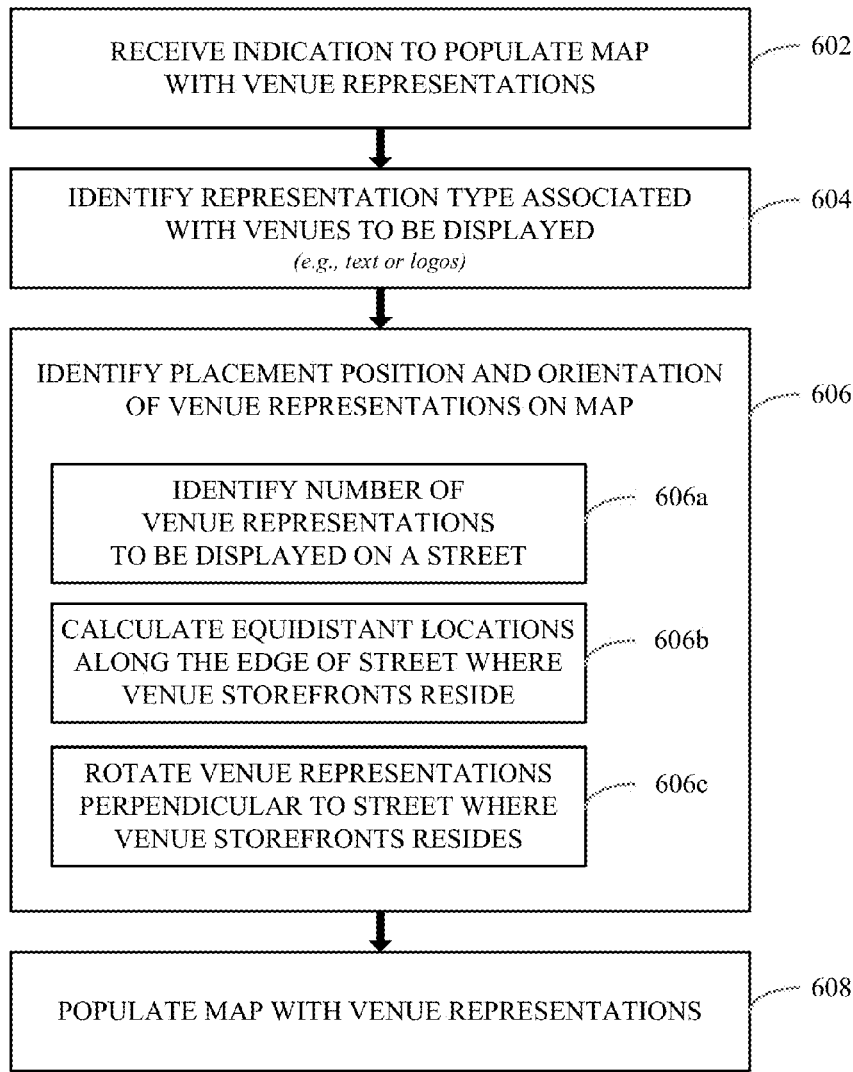

FIG. 6A is a flow diagram illustrating a method 600 for determining venue representations and determining their corresponding display on the interactive map, according to an embodiment of the invention. Referring to FIG. 6A, method 600 may be initiated upon receiving, at block 602, an indication to populate the interactive map with venue representations. Representation types (i.e., text, logos, category icons, etc.) associated with venues may be identified, at block 604, to be displayed on the interactive map. Method 600 may then identify, at block 606, the placement position and orientation of venue representations on the interactive map, taking into consideration the number of venue representations to be displayed, equidistant locations between adjacent venue representations and rotational aspects for placement of the venue representations corresponding to their location on a street where their storefronts reside, respectively, at blocks 606a, 606b and 606c. Thereafter, the interactive map may be populated, at block 608, with the venue representations.

Figure 6B:
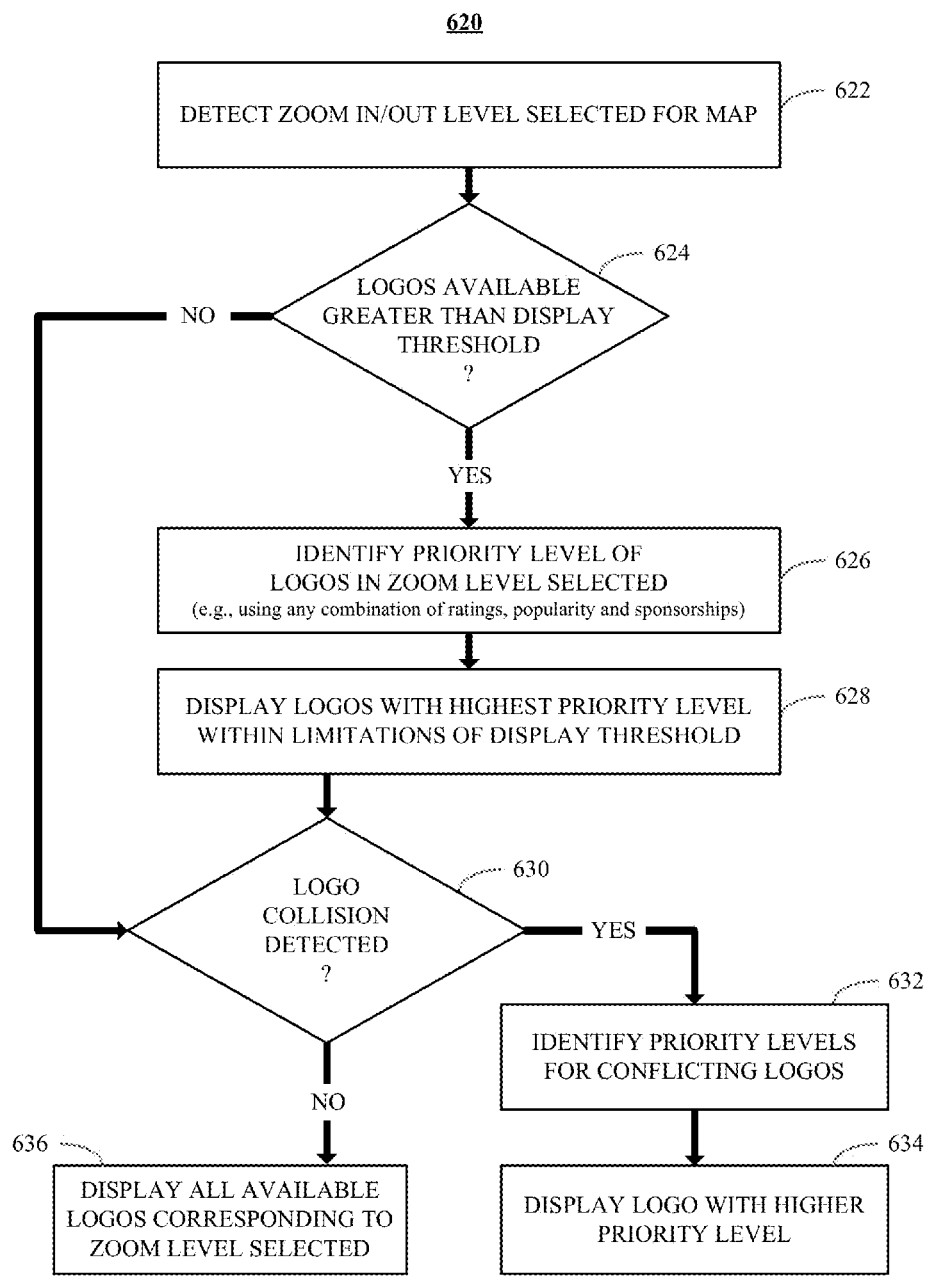

FIG. 6B is a flow diagram illustrating a method 620 for determining venue representations based on a zoom level of the interactive map, according to an embodiment of the invention. Referring to FIG. 6B, method 620 may be initiated upon detecting, at block 622, a zoom level associated with the interactive map displayed. Method 620 may make a determination, at block 624, whether the number of venue representations (e.g., venue logos) to be displayed exceeds a predefined display threshold value for the detected zoom level. If an affirmative determination is made, then method 620 may be configured to identify, at block 626, priority levels associated with the venue representations and display, at block 628, venue representations with the highest priority level within limitations of the display threshold value. A subsequent determination may be made, at block 630, to determine whether any identified or prevailing venue representations selected for display are subject to collision (e.g., overlap on the interactive map). If an affirmative determination is made, then method 620 may be configured to further identify, at block 632, priority levels of conflicting venue representations and display, at block 634, venue representations with higher priority levels.

To determine priority levels associated with venues, stored venues previously identified by an end user, the recommendation search engine or a combination thereof (previously described in conjunction with method 300 of FIG. 3A) may be employed by method 620. For example, the recommendation search engine may retrieve rating information associated with venues to assign priority levels. Rating information may be based on popularity of a venue, as determined by independent venue rating sources, ratings provided by an end user community or a combination thereof. Alternatively, priority levels associated with venues may be determined based on sponsorships relating to the venues. Additionally, priority may be given to venues that have a high "hotness" value, as previously described in conjunction with method 300 of FIG. 3A.

Figure 6C:
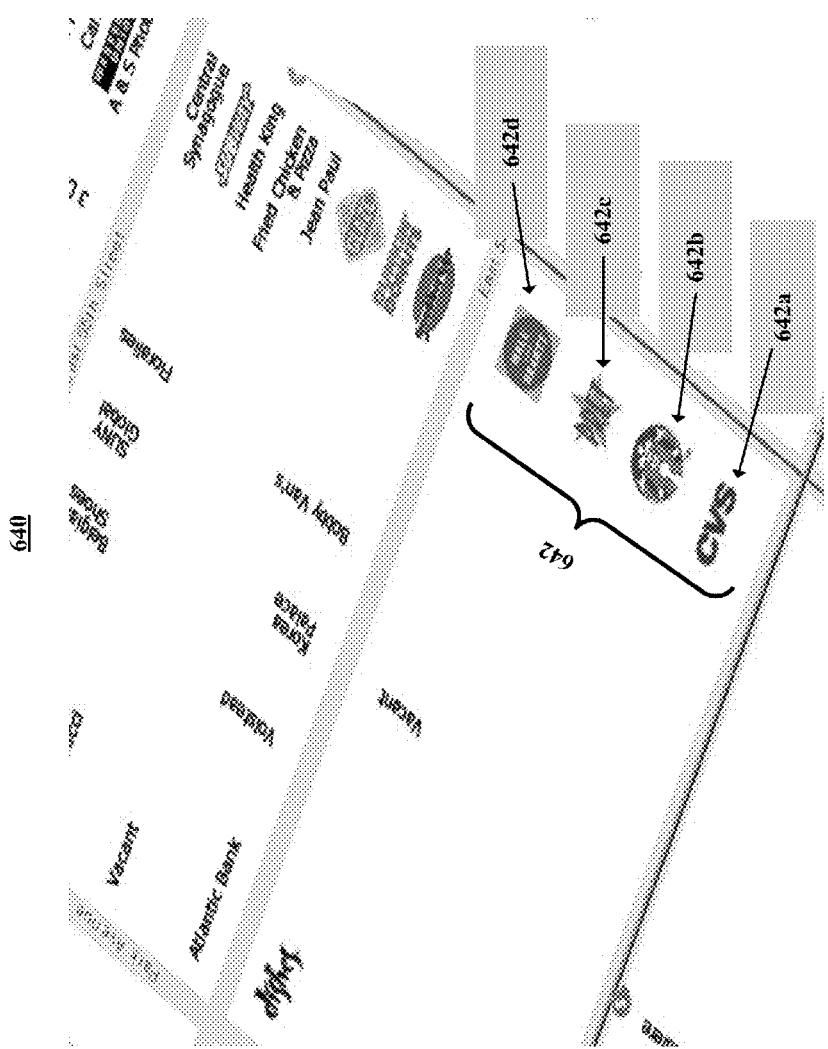
FIGS. 6C and 6D are screen shots illustrating zoom levels incorporating venue priorities associated with the aforementioned methods.
Figure 6D:
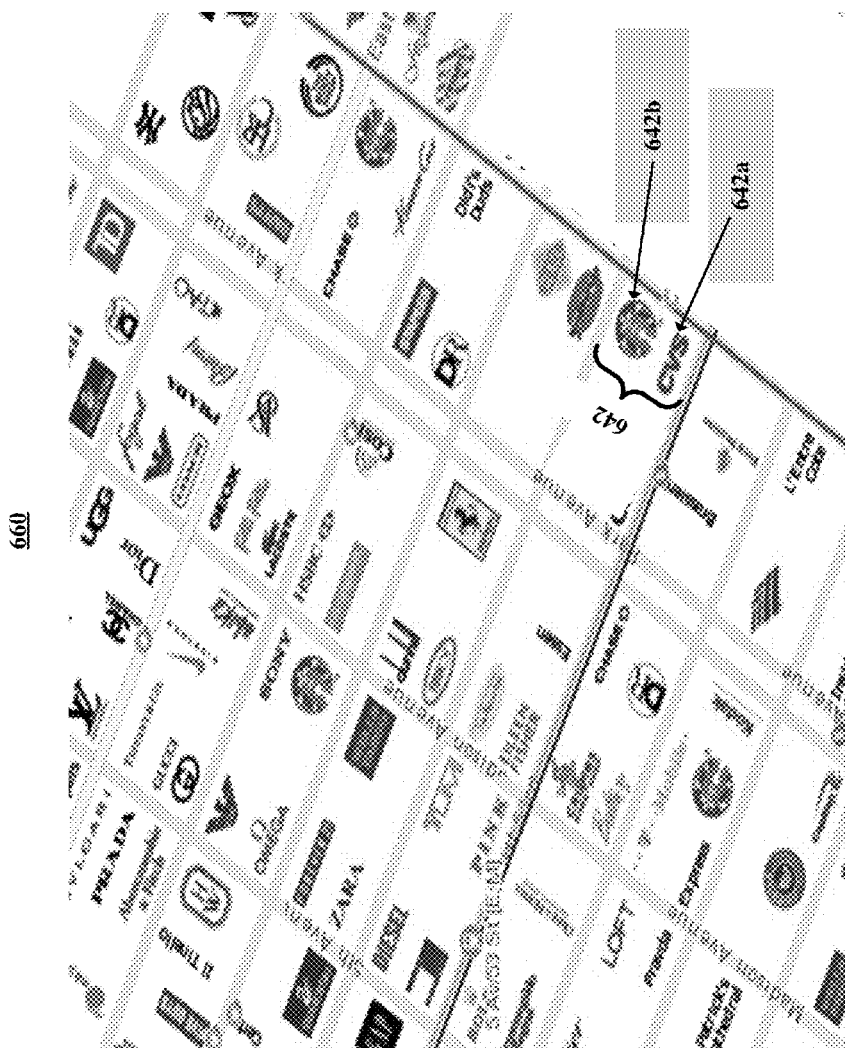

FIG. 6C is a screen shot 640 illustrating a zoomed-in view of an area of the interactive map having a plurality of venue representations 642 comprising a first venue logo 642a, a second venue logo 642b, a third venue logo 642c and a fourth venue logo 642d displayed on a city block. FIG. 6D is a screen shot 660 illustrating a zoomed-out view of the same area of the interactive map illustrated in screen shot 640 of FIG. 6C. As can be seen, focusing on the same city block in screen shot 660, only first venue logo 642a and second venue logo 642b are permitted to be displayed. The determination to display first venue logo 642a and second venue logo 642b and to remove from display third venue logo 642c and fourth venue logo 642d may be based on the priority levels associated with each of their corresponding venues. Which of the plurality of venue representations 642 are displayed at a particular zoom level of the interactive map may be determined, for example, by method 620 of FIG. 6B.

Figure 7A:
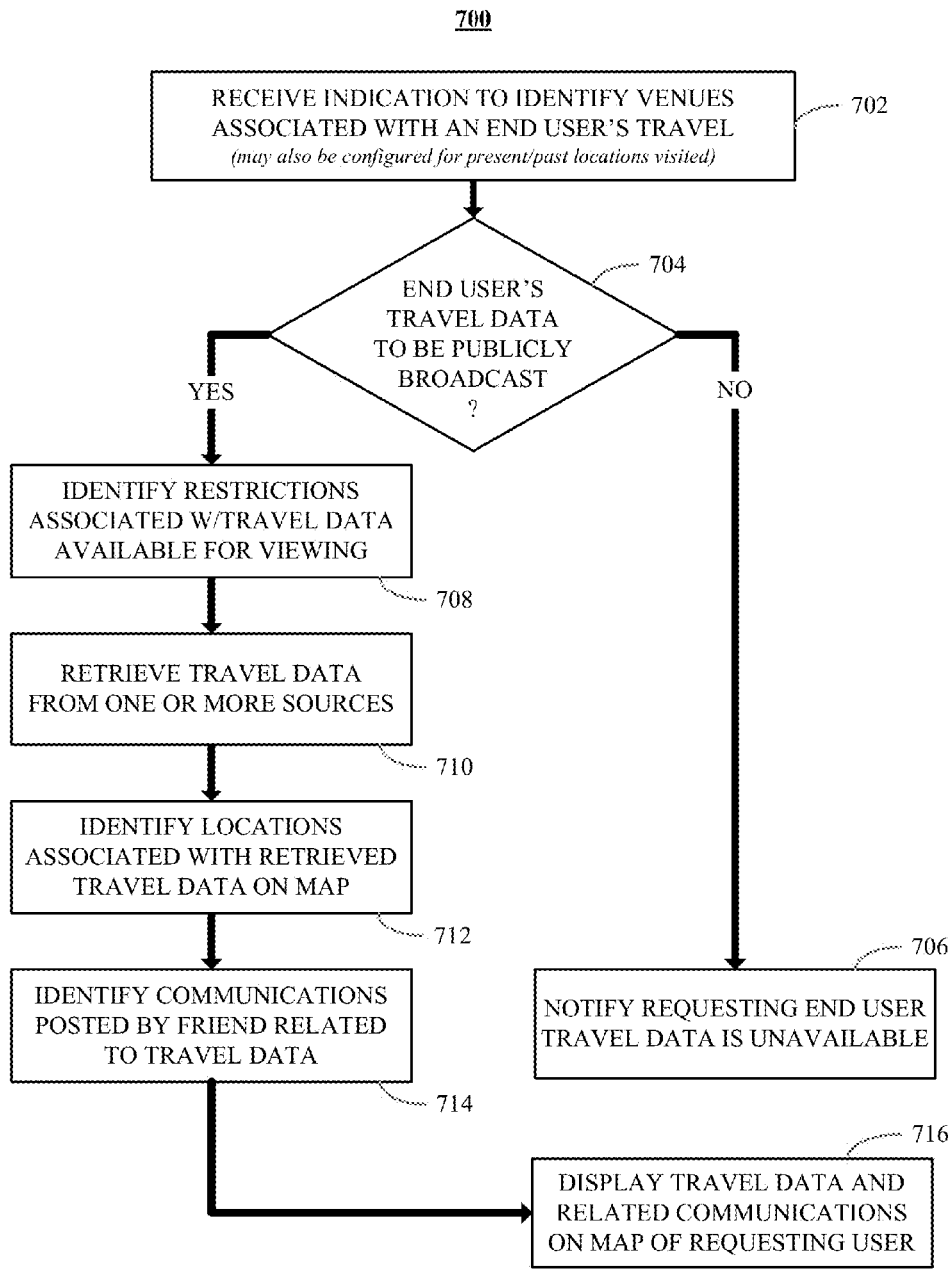

FIG. 7A is a flow diagram illustrating a method 700 for enabling a friend tracking tool on the interactive map, according to an embodiment of the invention. Referring to FIG. 7A, method 700 may be initiated upon receiving, at block 702, an indication to identify venues associated with an end user's travel, which may include current or past points of travel.

Figure 7B:
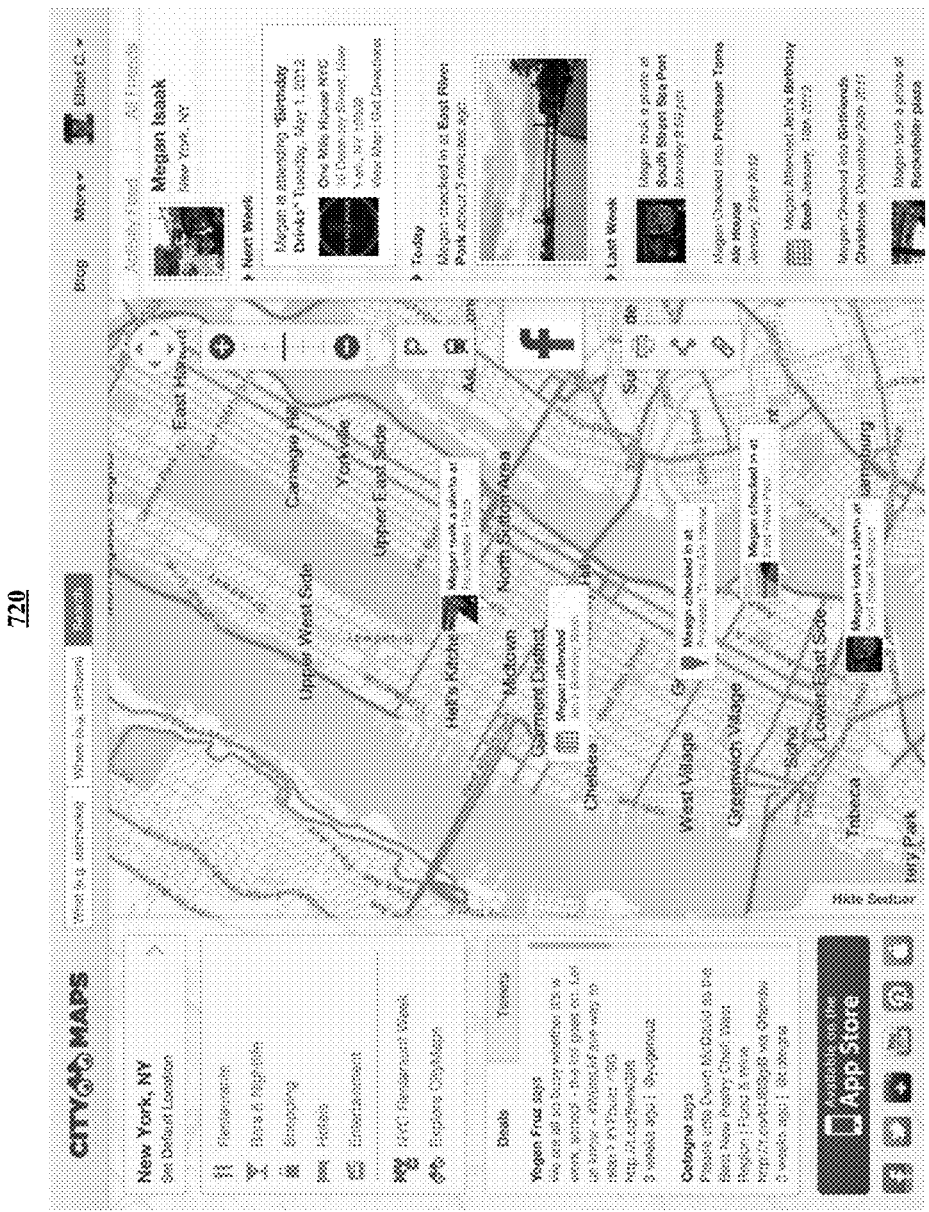
FIG. 7B is a screen shot illustrating various visual elements associated with the aforementioned method.

Method 700 may make a determination, at block 704, whether the travel data sought is enabled to be publicly broadcast. If the end user's travel data is not publicly available, a notification may be generated, at block 706, informing a requesting end user that the travel data for the desired end user is unavailable. Otherwise, method 700 may proceed to identify and retrieve, at blocks 708, 710, 712 and 714, various information (e.g., locations visited, communications posted relating to locations visited, etc.), while taking into consideration limitations set by a broadcasting end user, to be displayed, at block 716, on the interactive map of the requesting end user. FIG. 7B is a screen shot 720 illustrating elements of the friend tracking tool as it may be displayed to the requesting end user.

Figure 8:
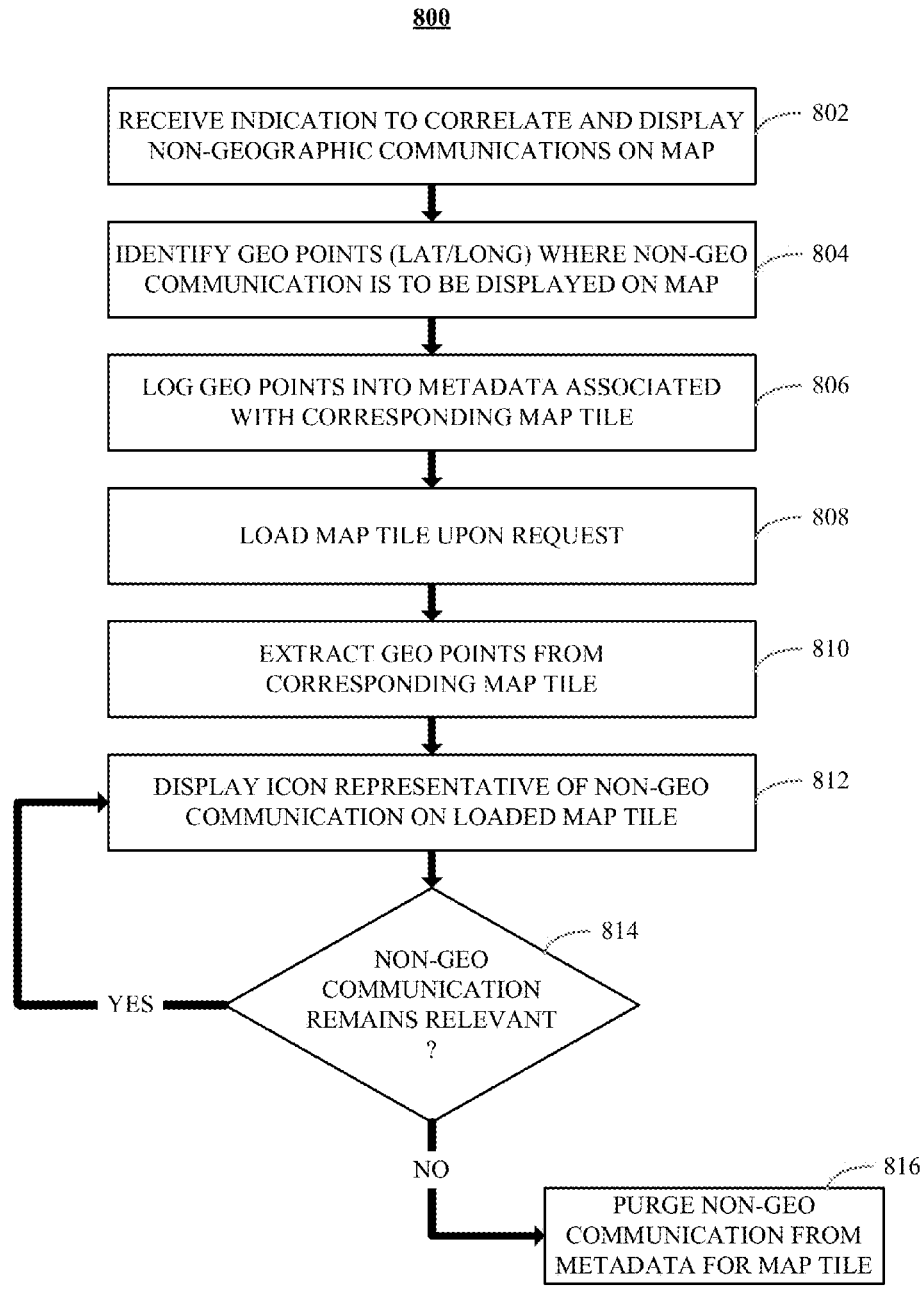
FIG. 8 is a flow diagram illustrating an embodiment of a method for correlating non-geographic communications on the interactive map.

FIG. 8 is a flow diagram illustrating a method 800 for correlating non-geographic communications on the interactive map, according to an embodiment of the invention. Referring to FIG. 8, method 800 may be initiated upon receiving, at block 802, an indication to correlate and display non-geographic communications on the interactive map. Geographic points where non-geographic communications are to be displayed, for example in association with a venue, may be identified, at block 804, and logged, at block 806, into metadata associated with a corresponding map tile comprising the venue of interest. When the corresponding map tile is loaded, at block 808, for display on the interactive map, the geographic points may be extracted, at block 810, from the map tile in order to display, at block 812, an icon representative of the non-geographic communication on the loaded map tile. Method 800 may make a determination, at block 814, whether the non-geographic communication remains relevant and, if not, it may purge, at block 816, that communication from metadata correlating the same to a venue on the interactive map.

The interactive map may be comprised of a base layer map configured to receive elements representing geographic features and landmarks. A set of geographically placed venues, each associated with one or more categories, may be layered on the base layer map. A rendering tool may be made available to generate venue representations on the interactive map, which may be broken up into one or more pre-defined quadrants known as "map tiles". A map tile is built comprising all venues in all categories. Additional map tiles may also be constructed for each zoom level, for each category and any other applicable display criteria. Map tiles may be organized by city and location, wherein each map tile may be given a unique ID so that one or more map tiles in a map tile set may be easily retrieved when constructing the interactive map. Tile sets may be stored locally (e.g. in one or more servers determined to be closest in location to an end user engaging the interactive map) or, if a particular map tile is not available locally, it may be pulled from a repository and saved locally ("edge caching") for future use.

It should be noted that the sequence of operations described in conjunction with methods 300, 400, 450, 500, 520, 600, 620, 700 and 800 may be different from that illustrated, respectively, in corresponding FIGS. 3A, 4A-5B, 6A, 6B, 7A and 8. For example, the operations at block 318 illustrated in method 300 of FIG. 3A may be executed before the operations at blocks 304, 310 and 314.

Figure 9:
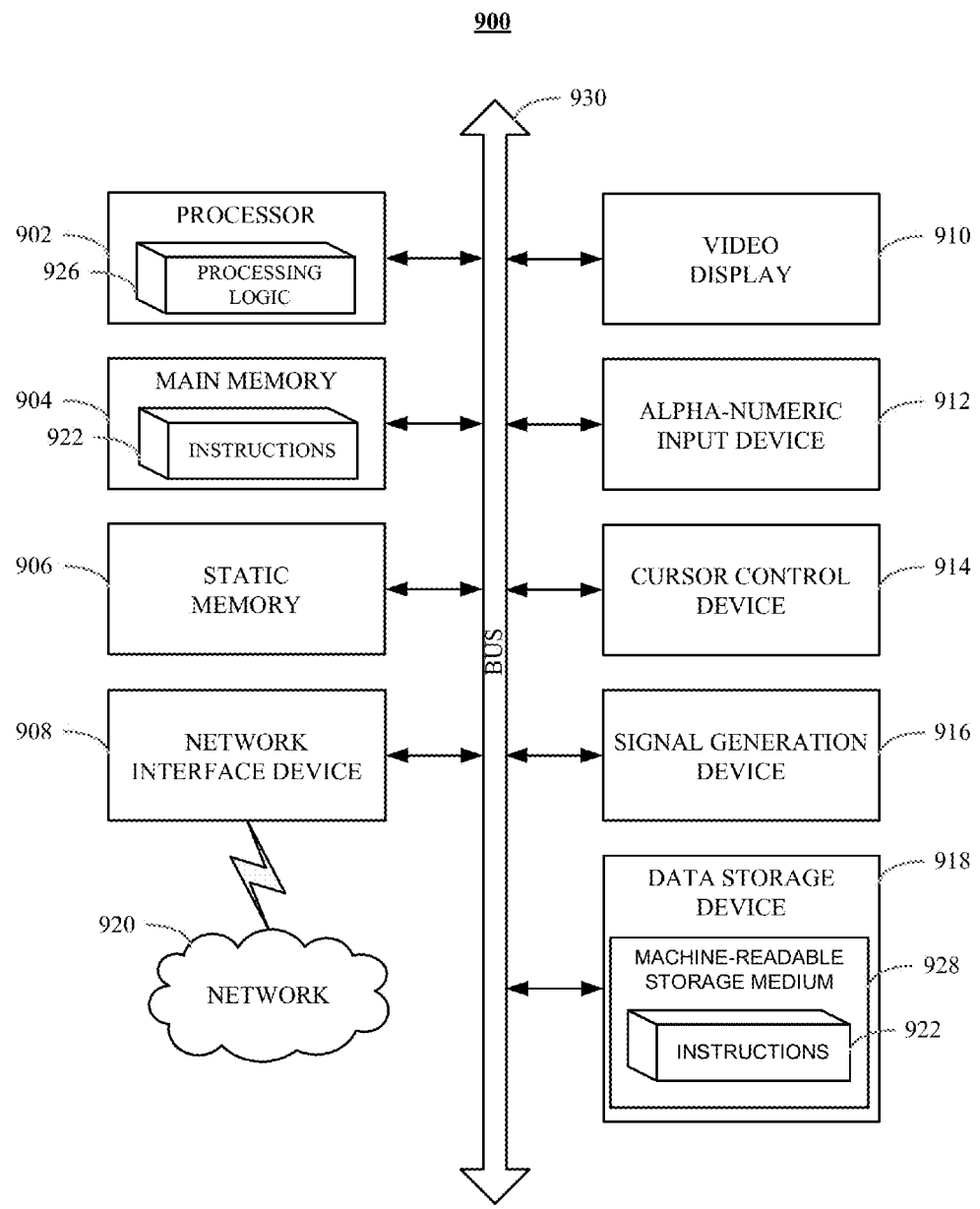
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 may be comprised of a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute processing logic 826 for performing the operations and steps discussed herein.

Computer system 900 may further include a network interface device 908. Computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

Data storage device 918 may include a machine-readable storage medium (or more specifically a computer-readable storage medium) 928 having one or more sets of instructions (e.g., software 922) embodying any one or more of the methodologies of functions described herein. For example, software 922 may store instructions to manage a logo-enabled interactive map. Software 922 may also reside, completely or at least partially, within main memory 904 and/or within processing device 902 during execution thereof by computer system 900; main memory 904 and processing device 902 also constituting machine-readable storage media. Software 922 may further be transmitted or received over a network 920 via network interface device 908.

Machine-readable storage medium 928 may also be used to store instructions for managing a logo-enabled interactive map. While machine-readable storage medium 928 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

We claim:

1. A computer-implemented method of populating a map with venue representations, said method comprising:
   receiving, at a programmed computer, an indication to populate said map with venue representations;
   identifying, using said programmed computer, a zoom level display of said map, wherein a permissible number of said venue representations to be displayed on a street is determined based at least in part on said zoom level;
   determining, using said programmed computer, whether a plurality of venue representations identified for display on said street are subject to a collision incident, said collision incident affirming a detected overlap of said plurality of venue representations, and said detected overlap requiring a conflict resolution measure to be executed to select only one of said plurality of venue representations subject to said collision incident to be displayed on said street at said zoom level;
   identifying, using said programmed computer, a placement position and orientation for each of said venue representations to be populated on said map, wherein said placement position and orientation comprises calculating equidistant locations along an edge of said street where venue storefronts reside, and wherein said venue representations are oriented perpendicular to said street where venue storefronts reside; and
   populating, using said programmed computer, said map with said venue representations.

2. The method of claim 1, wherein said venue representation is a logo-based identifier associated with a venue.

3. The method of claim 2, wherein said venue representation is a text-based identifier when said logo-based identifier is not available for a venue.

4. The method of claim 1, wherein said venue representation is a category icon associated with a venue.

5. The method of claim 1, further comprising populating said map with one or more non-geographic elements to be associated with said one or more venue representations populated on said map.

6. The method of claim 5, wherein a non-geographic element is an offer, deal or promotion associated with at least one of said venue representations populated on said map.

7. The method of claim 5, wherein a non-geographic element is a social media posting associated with at least one of said venue representations populated on said map.

8. The method of claim 1, further comprising determining whether a plurality of said venue representations available to be populated on said map exceeds a threshold value associated with said zoom level display of said map.

9. The method of claim 8, wherein a priority level is associated with each of said plurality of said venue representations.

10. The method of claim 9, wherein said priority level is based on venue ratings, venue popularity, venue sponsorships or a combination thereof.

11. The method of claim 9, wherein said priority level is based on user personalization attributes, user relevance attributes or a combination thereof.

12. The method of claim 9, wherein said plurality of said venue representations with higher priority levels are selected to be displayed before said plurality of said venue representations with lower priority levels can be selected to be displayed.

13. The method of claim 1, wherein said conflict resolution measure comprises identifying a priority level associated with each of said overlapping venue representations, said venue representation with highest priority level being displayed on said street.

14. A computer system for populating a map with venue representations, said computer system comprising:
   a memory; and
   a processing device communicatively coupled to said memory, said processing device configured to:
      receive an indication to populate said map with venue representations;
      identify a zoom level display of said map, wherein a permissible number of said venue representations to be displayed on a street is determined based at least in part on said zoom level;
      determine whether a plurality of venue representations identified for display on said street are subject to a collision incident, said collision incident affirming a detected overlap of said plurality of venue representations, and said detected overlap requiring a conflict resolution measure to be executed to select only one of said plurality of venue representations subject to said collision incident to be displayed on said street at said zoom level;
      identify a placement position and orientation for each of said venue representations to be populated on said map, wherein said placement position and orientation comprises calculating equidistant locations along an edge of said street where venue storefronts reside, and wherein said venue representations are oriented perpendicular to said street where venue storefronts reside; and
      populate said map with said venue representations.

15. A non-transitory computer-readable storage medium programmed to include instructions that, when executed by a processing device, cause said processing device to perform a method of populating a map with venue representations, said method comprising:
   receiving an indication to populate said map with venue representations;
   identifying a zoom level display of said map, wherein a permissible number of said venue representations to be displayed on a street is determined based at least in part on said zoom level;
   determining whether a plurality of venue representations identified for display on said street are subject to a collision incident, said collision incident affirming a detected overlap of said plurality of venue representations, and said detected overlap requiring a conflict resolution measure to be executed to select only one of said plurality of venue representations subject to said collision incident to be displayed on said street at said zoom level;
   identifying a placement position and orientation for each of said venue representations to be populated on said map, wherein said placement position and orientation comprises calculating equidistant locations along an edge of said street where venue storefronts reside, and wherein said venue representations are oriented perpendicular to said street where venue storefronts reside; and
populating said map with said venue representations.

* * * * *